UNITED STATES PATENT OFFICE.

CHARLES E. NORTH, OF NEW YORK, N. Y.

PROCESS OF EXTRACTING BUTTER FAT OR OIL FROM MILK AND CREAM.

1,416,053.  Specification of Letters Patent.  Patented May 16, 1922.

No Drawing.  Application filed September 4, 1920. Serial No. 408,339.

*To all whom it may concern:*

Be it known that I, CHARLES E. NORTH, a citizen of the United States, residing at New York city, in the county of New York and State of New York, have invented a certain new and useful Process of Extracting Butter Fat or Oil From Milk and Cream, of which the following is a specification.

This invention pertains to an improved process of separating milk fat or butter oil from milk and from cream, and involves the employment of the steps hereinafter set forth whereby a pure fat or oil is obtained free of any alteration whatever either as to composition or as to taste. The spoilages of butter are due to the presence of casein and water which are normal ingredients of butter. The milk oil or butter fat extracted by my process is from 98° to 100° pure oil from which practically all of the casein and water have been taken out. The oil has consequently keeping qualities which are superior to those of butter. The oil which results from the practice of the invention may be employed in the reconstruction of cream for use in making ice-cream, or in the reconstruction of milk. The oil can also be made into butter by churning with skim milk, or by churning with hot water and milk powder. In short, with the oil which results from the process I can produce milk, cream, ice-cream, and butter, using the oil as a raw material or base.

The percentage of butter fat in ordinary cow's milk averages about 3.5%, and I extract this fat from the milk in the form of pure oil having a yellow color, in the following manner where milk is the initial substance treated:

First pass the milk through an ordinary cream separator, separating the milk into skim milk and cream so that the cream will have a butter fat percentage of from 40 to 50% from the ordinary separator, but the percentage may be reduced to a point for proper agitation to approximately 30% by the addition of water.

Secondly, the cream thus separated and which contains practically all of the fat of the milk, is agitated so that it passes into a frothy mass which is substantially of the nature of ordinary whipped cream. This mass may be produced in a variety of ways. Thus the production of the froth or fluffy mass may be effected by agitation with an ordinary egg-beater, a revolving disk, or a dasher, or an ice cream freezer, such agencies being operated at high speed. The frothy mass may also be produced by the injection of air under pressure and, as in the cases just mentioned, the cream is aerated and becomes filled with bubbles. The presence of the air bubbles is not, however, essential, but is merely incidental to the chief action which is accomplished, whereby the fat globules which are scattered through the cream in its natural state are beaten together in little clumps; or in other words, the fat particles coalesce in small masses. These clumps or agglomerates are not large enough to be seen with the naked eye, as they are in the ordinary churning process for the production of butter, but under the microscope the clumps will be observed showing large clear spaces of the milk serum between them. In other words, the small fat globules are no longer scattered, but are gathered together in small masses floating in the milk serum. The effect of the operation is to secure impact of the fat particles so that two or more agglomerate or coalesce whether by fast or slow agitation.

The production of the fat particles agglomerated in the condition just set forth may be likened to butter making in the miniature which is microscopic in its minuteness. Agitation at a high rate or at a high speed is desirable as it greatly shortens the time of the process and in this the process differs from the ordinary churning process in which butter, as such, is produced. In the whipping operation above described the speed of the revolutions of the agitator may be from 500 to 3,000 revolutions per minute and the process completed in from one to three minutes. The action which takes place must be sharply distinguished from ordinary churning for the production of butter in which the cream is slightly or slowly beaten, as at the rate of 40 to 50 revolutions per minute and the process occupies from 40 to 60 minutes.

Thirdly, the mass produced as above set forth is then mixed with hot water having a temperature range of between 100 and 212 degrees Fahrenheit. The butter fat immediately begins to separate, forming a yellow oil which floats on the surface of the bath or body of water, while the other ingredients of the cream, including such skim milk as may be present either remain in solution dissolved in the water underlying the fat or oil or settle to the bottom as a sediment. A substantially complete and highly satisfactory separation of the oil from the other ingredients is thus effected.

Fourthly, the separated oil is freed from the water. This is accomplished by passing the mixture of oil and hot water through an ordinary centrifugal oil separator. Such oil separators are well known and are to be distinguished from the ordinary cream separators, as the latter will not be effective in the practice of the present step of the invention. In fact, any attempt to directly separate milk fat or butter oil from milk by such oil separators will utterly fail, but with the method of preparation as above set forth, the oil may be readily and effectively recovered in a pure and unaltered state.

Where the initial material to be treated is cream, then of course the first step in the process as above recited is omitted.

When sweet cream is treated by whipping, the desired agglomeration or coalescence of fat globules requires a slightly longer time than in the case of sour cream. The hot water dilution produces a layer of yellow oil on the surface of the water while the casein and other solids remain in solution in the water.

With cream which is sour and contains acid in a greater or less amount causing a coagulation or transformation of the casein into a stiff curd, I find that the whipping process is helped if water is added to the cream at the time the whipping is effected, the addition of the water diluting the curd and thereby allowing a more ready separation of the fat constituents. The ordinary sour cream in a liquid state when whipped will be transformed into a froth the same as is obtained with sweet cream, and the separation of the oil takes place more rapidly when such whipped sour cream is added to hot water than in the case of sweet whipped cream. The curd of the sour cream is coagulated and settles to the bottom of the settling tank.

As a specific example, I may state that in practice I have found that with cream having 30% butter-fat at a temperature between 50° and 60° F., preferably approximately 55° F., may be successfully agitated or whipped for my process within a period of three minutes and the fat may be caused to separate from the other milk constituents by the addition to said agitated cream of water to fully dilute the same, preferably twenty times or more its volume at a temperature between 150° and 212° F., preferably at about 160° F., the mass being permitted to stand until the fat rises in an oily layer. In the case of sweet cream having an acidity of .2 or less the casein is in solution and is diluted by the addition of water so that the fat will readily rise from the mass, whereas in the case of sour cream it is desirable that it have an acidity of .9 or more to insure a coagulation sufficient to cause the precipitation of the coagulated casein by hot water dilution so that the casein is thereby separated from the oil or fat which rises in an oily layer.

It is to be noted that in carrying out my process, no chemicals or steam are used, and the oil produced is superior to that which results from other processes wherein chemicals or steam are necessarily employed. The oil obtained is pure and is unaltered in composition and is uninjured in taste. The flavor of milk fat or oil is very easily injured. By the process above described the flavor is not altered in any way. Such oil is therefore superior for use in the reconstruction of cream for ice-cream or milk. Such reconstruction is performed by using machinery which mixes the oil with skim milk or with milk powder and hot water, whereby the oil is re-emulsified and produces milk or cream which can be used as such for the manufacture of ice-cream. The oil can also be made into butter by churning with skim milk, or by churning with hot water and milk powder. In short, I propose to produce milk, cream, ice-cream, and butter, using the pure oil obtained by my process as a raw material.

In carrying out the process above set forth to secure the best results certain important matters should be carefully observed, but these can best be determined by practical tests. There are the temperatures of the cream, the acidity of the cream, the proportion of water, the temperature of the water and the like. All these are, however, well within the skill of the operator.

I us the term "cream" as a generic term applicable to cream secured by separation or to a milk so constituted that upon agitation the fat particles may be fairly rapidly coalesced or brought to a state of agglomeration when agitated.

Having thus described my invention what I claim is:—

1. In the process of extracting oil from milk, subjecting cream to agitation to secure agglomeration of the fat particles, and admixing therewith water at a temperature to substantially liquefy said particles and in amount to effect the rising of such fat in an oily layer.

2. In the process of extracting oil from milk, subjecting cream to agitation at such a temperature as to promote agglomeration of the fat particles, and admixing therewith water at a temperature to substantially liquefy said particles and in amount to effect the ready rising of such fat in an oily layer.

3. In the process of extracting oil from milk, whipping cream at a temperature between 50° and 60° F. to cause agglomeration of the fat particles, and admixing therewith water at a temperature to substantially liquefy said particles and in amount to effect the rising of such fat in an oily layer.

4. In the process of extracting oil from milk, subjecting cream to agitation to secure agglomeration of the fat particles, and admixing therewith water at a temperature between 160° and 212° F to substantially liquefy said particles and in amount to effect the rising of such fat in an oily layer.

5. In the process of extracting oil from milk, subjecting cream to agitation to secure agglomeration of the fat particles, and admixing therewith water at a temperature to substantially liquefy said particles and in amount of approximately twenty times the volume of the cream to effect the rising of such fat in an oily layer.

In testimony whereof I have signed my name to this specification.

CHARLES E. NORTH.